United States Patent [19]

Warren

[11] Patent Number: 4,698,721

[45] Date of Patent: Oct. 6, 1987

[54] POWER LINE FILTER FOR TRANSIENT AND CONTINUOUS NOISE SUPPRESSION

[75] Inventor: George H. Warren, Newport News, Va.

[73] Assignee: Puroflow Corp., Santa Monica, Calif.

[21] Appl. No.: 892,895

[22] Filed: Aug. 1, 1986

Related U.S. Application Data

[63] Continuation of Ser. No. 549,436, Nov. 7, 1983, abandoned.

[51] Int. Cl.⁴ .............................................. H02H 1/04
[52] U.S. Cl. ..................................... 361/110; 361/55; 361/56; 361/91; 361/119; 361/111

[56] References Cited

U.S. PATENT DOCUMENTS

| 2,939,095 | 5/1960 | Chertok | 361/111 X |
| 4,023,071 | 5/1977 | Fussell | 361/56 |
| 4,259,705 | 3/1981 | Stifter | 361/56 |
| 4,616,286 | 10/1986 | Breece | 361/56 |

FOREIGN PATENT DOCUMENTS

2501931  9/1982  France .................................. 361/56

OTHER PUBLICATIONS

G.E. Application Note, May 1961, p. 17.
"Hardening Techniques"—Godts et al., 1979 IEEE International Symposium on Electromagnetic Compatability, Seattle, WA, 2-4 Aug. 1977.
"A Guide to the Use of Spark Gaps for Electromagnetic Pulse (EMP) Protection", by William C. Hart and Danile F. Higgins, 1973, Joslyn Electronic Systems.
"Protecting Electronic Gear from Unexpected Energy Surges", Graham A. Clarkson, *Telephony*, Mar. 5, 1979, pp. 34–36.
"Protecting Electronic Equipment from Uncontrolled Energy Bursts", Graham A. Clarkson, *Telephony*, Feb. 19, 1979, pp. 86–88.
"Protection: Prescriptions for an Old Surging Headache", Graham A. Clarkson, *Telephony*, Feb. 12, 1979, pp. 24–29.

*Primary Examiner*—A. D. Pellinen
*Assistant Examiner*—Jeffrey A. Gaffin
*Attorney, Agent, or Firm*—Staas & Halsey

[57] ABSTRACT

A power line filter suppresses or dissipates and clamps short rise time high voltage transients carried by power transmission lines and provides continuous protection against continuous type induced noise. The power line filter includes one or more modules connected to either direct current or alternating current power lines to protect sensitive electrical equipment from the transients and continuous noise. The module used with a direct current power line includes a continuous suppressor connected between a source and load, and a selenium surge suppressor and a metal oxide varistor connected in parallel across the source. The module used with an alternating current power line includes a continuous suppressor connected between the source and the load, and a selenium surge suppressor and a gas tube connected in parallel across the source. The module used with the alternating current power line can also include a metal oxide varistor also connected in parallel across the source. The alternating current power line filter modules can be connected to single phase, two-phase or three-phase wye and delta power systems. The power line filter module provides instantaneous reaction to noise transients and a broad range of energy dissipation or shunting capability along with protection from continuous type noise.

25 Claims, 15 Drawing Figures

POWER LINE FILTER FOR TRANSIENT AND CONTINUOUS NOISE SUPPRESSION

This is a continuation of co-pending application Ser. No. 549,436 filed on Nov. 7, 1983, now abandoned.

BACKGROUND OF THE INVENTION

The present invention relates to a filter for filtering electromagnetic interference coupled to and carried by power lines and, more particularly, to a filter for instantaneously filtering impulse or transient noise signals applied to a power line from such sources as lightning, nuclear explosions and large equipment switching surges which also continuously filters continuous type noise signals to protect sensitive electronic equipment connected to the power line.

Communications equipment, computers, military targeting systems, home stereo amplifiers, televisions and other electronic devices are increasingly characterized by small electrical contacts and miniature components which are very vulnerable to interference or damage from stray electrical energy of both the transient and continuous type carried by power lines. Unpredictable variations in power line voltage, as well as continuous noise thereon, changes the operating range of the equipment and can severely damage or destroy such electronic devices. These electronic devices are very expensive to repair or replace and, therefore, require cost effective transient and continuous type noise protection.

One source of harmful noise is radio frequency interference that can be coupled to the power lines from a multitude of sources. The power lines act as large antennas that can be stretched out over several miles and which can have significant radio frequency noise coupled thereto from such sources as radio broadcast antennas.

Another source of harmful radio frequency energy is from the equipment to be protected, such as computers. Today the Federal Communications Commission has elaborate test procedures to prevent computers from being marketed that cause severe noise problems. Nevertheless, older computers still exist which emit significant amounts of radio frequency interference.

Another harmful source is conducted noise generated by equipment connected to the power lines which is conducted along the power lines to the equipment to be protected.

A further source of harmful electrical energy is lightning. Lightning is a very complex electromagnetic energy source having potentials estimated at from five million to twenty million volts and currents reaching thousands of amperes. A lightning strike generally contains a series of pulses each having a duration of from one nanosecond to several milliseconds. A typical "8/20" lightning pulse lasts for a period of 40 milliseconds and has a peak current of 20,000 amps which is reached in 8 microseconds.

Another source of unwanted electromagnetic energy is a nuclear electromagnetic pulse. An electromagnetic pulse for a nuclear detonation produces intense transient electric and magnetic fields with very short rise times and a frequency spectrum extending from approximately zero to more than 100 megahertz. The electromagnetic pulse from a high altitude explosion typically has a maximum field strength near the ground on the order of 50 kilovolts per meter, a time duration of one microsecond and a rise time of nanoseconds.

Other sources of impulse noise are switchng transients caused by turning on and off large banks of equipment and large motors, and ground loop interference caused by varying ground potentials.

The above-mentioned noise transients and continuous noise can be coupled to a sensitive electronic device by external or internal coupling or induction. In external coupling, noise impinges on a receiver, such as a power transmission line or system, and the noise voltage induced in the receiver is passed through transformers, rectifiers and other voltage and current altering devices to the sensitive electronic device. The passage of the noise through such devices as transformers substantially alters the original waveform increasing the current levels, and the voltage levels, and altering the frequency spectrum. The characteristics of the noise reaching the sensitive equipment can be hard to predict because of the intermediate coupling devices, thereby making the noise hard to remove. Thus, there is a need in the art for a filtering device that has a broad range of energy absorption and/or shunting capability which responds continuously and instantaneously to any type of undesired noise.

SUMMARY OF THE INVENTION

It is an object of the present invention to provide a power line filter that suppresses continuous and transient noise that can be coupled from power lines.

It is another object of the present invention to provide a power line filter that filters electromagnetically induced interference.

It is a further object of the present invention to provide a power line filter that filters radio frequency interference.

It is another object of the present invention to provide a power line filter that suppresses common-mode and differential-mode noise.

It is still another object of the present invention to provide a power line filter suitable for low leakage applications.

It is an object of the present invention to provide a power line filter capable of suppressing large short rise time transient impulses.

It is another object of the present invention to provide a power line filter having an instantaneous response or zero time delay.

It is a further object of the present invention to provide a power line filter having broad range of transient surge suppression and shunting capability.

It is another object of the present invention to provide a power line filter having the ability to suppress electromagnetic interference capable of causing damage to sensitive electrical equipment.

It is still another object of the present invention to provide a power line filter for filtering electrical ground loop noise interference.

It is moreover another object of the present invention to provide a power line filter applicable to all types of power lines, including: alternating current single phase, two-phase, three-phase wye and delta power lines; and direct current power lines.

The power line filter of the present invention can be connected to protect a direct current powered device or an alternating current powered device. When connected to protect an alternating current device, the power line filter includes a transient suppressor connected between the power lines and a continuous suppressor connected between the power lines and the load. The continuous suppressor, in one version, contains capacitors and inductors and, in another version, additionally contains a resistor. The transient suppressor, in one version, includes a selenium surge suppressor, a metal oxide varistor and a gas tube all connected in parallel between the power lines. The alternating current power line filter module can be connected to protect single phase, two-phase and three-phase powered electronic equipment connected to power systems of both the wye and delta type. When connected to protect a direct current device, the power line filter includes capacitors and an inductor connected between the power lines and the load, and a selenium surge suppressor and a metal oxide varistor all connected in parallel between the power lines.

The various embodiments of the present invention provide instantaneous and continuous protection of sensitive equipment from unwanted noise coupled through a power line.

These, together with other objects and advantages which will be apparent, reside in the details of construction and operation as fully hereinafter described and claimed, reference being had to the accompanying drawings forming a part hereof, wherein like numerals refer to like parts throughout.

DESCRIPTION OF THE PREFERRED EMBODIMENTS

Figures 1, 2:
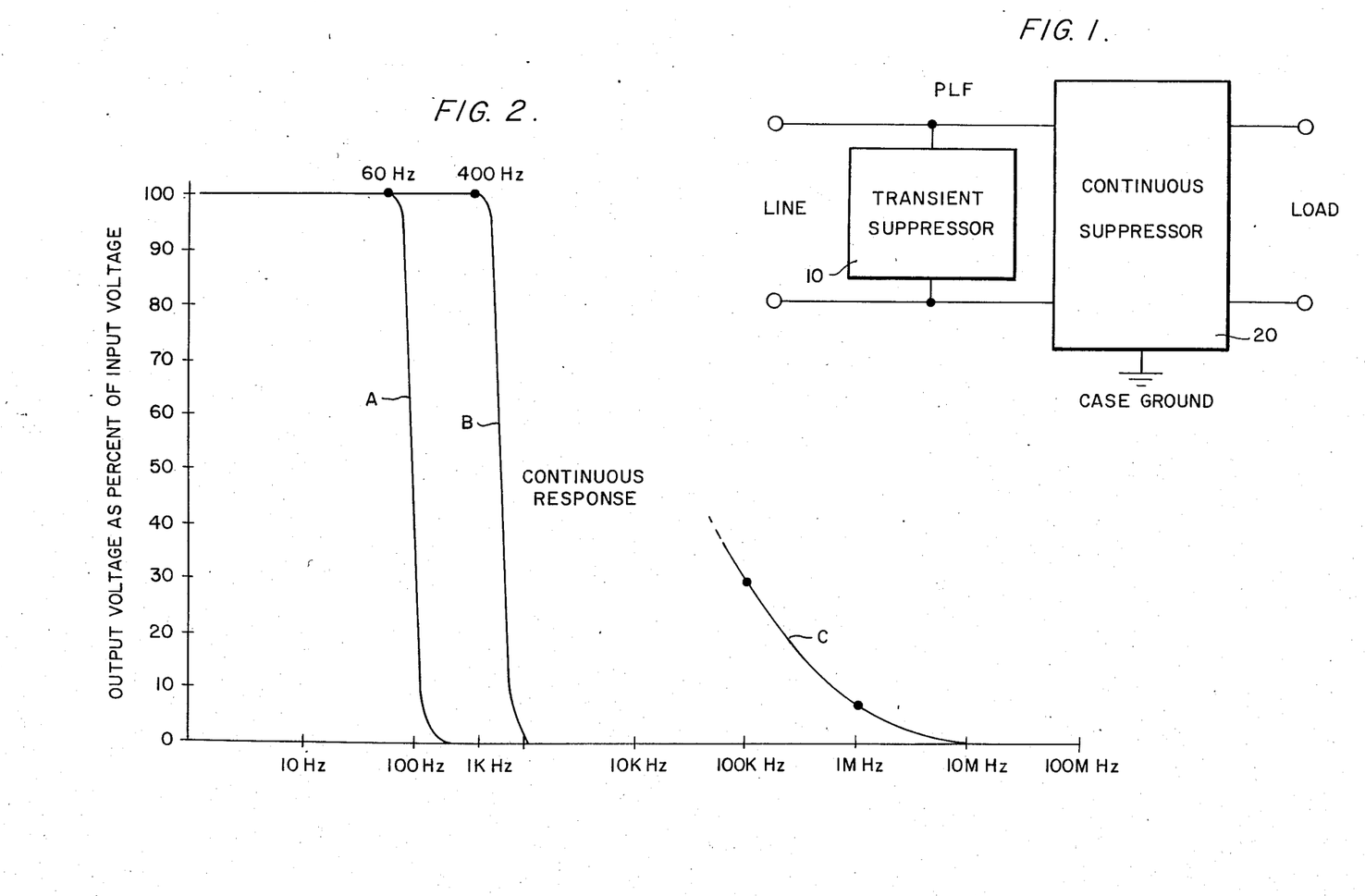
FIG. 1 is a block diagram of the components and connections of a generalized embodiment of the present invention.
FIG. 2 is a graph illustrating the theory of operation of the continuous suppressor 20 of FIG. 1.

FIG. 1 illustrates a general embodiment of the power line filter PLF of the present invention that can be connected to protect equipment sensitive from transients and continuous noise. A transient suppressor 10 is connected between the input power lines and a continuous suppressor is connected between the power lines and the load. The transient suppressor 10 shunts a transient or spike on the power line that has a short rise time while holding or clamping the line voltage at desired maximum level which will be discussed in more detail later. The continuous energy suppressor 20 is connected in series between the power lines and the load or device to be protected, and operates at all times.

Figure 3:
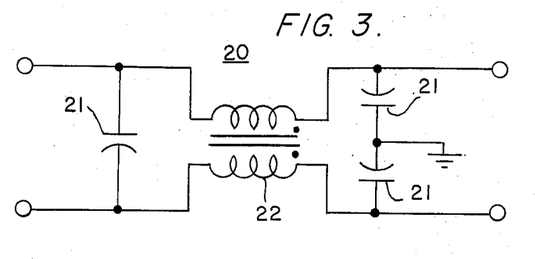
FIGS. 3-5 are detailed circuit diagrams for various versions of the continuous suppressor 20 in FIG. 1.
Figure 4:
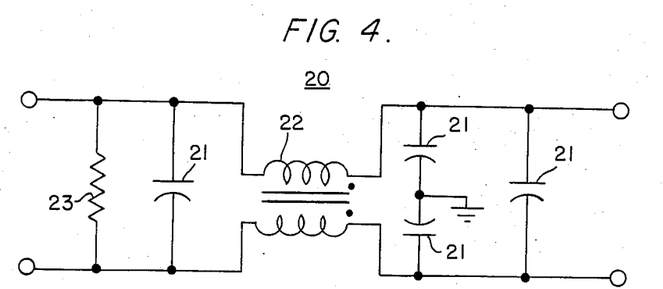
Figure 5:
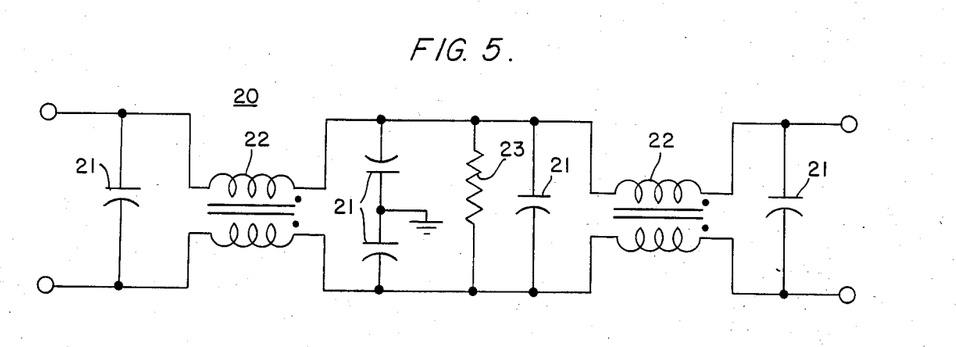

FIGS. 3-5 illustrate versions of the continuous suppressor 20. Capacitors 21, as is well known by those of skill in the art, can be thought of as low impedance paths taken by the unwanted AC components on the power line. One of the desired filtering characteristics of the continuous suppressor 20 can be controlled by selecting the value of the capacitors 21 using known filter design formulas. An inline inductor or transformer 22, as is will known by those of skill in the art, provides a relatively high impedance to the unwanted AC components on the power line and acts as a transient or continuous noise blocking device. Another of the desired characteristic of the continuous suppressor 20 can be controlled by selecting the value of the inductor 22 using known methods. A resistor 23 also helps control the characteristics of the continuous suppressor 20 in known ways. The proper selection of inductor, capacitor and resistor values allows the suppressor to be targeted at specific types of continuous noise. The use of capacitors and inductors in the continuous filters of FIGS. 3-5, because of the phase relationship of these devices, will inherently not only suppress transients but will dissipate long-term continuous interference throughout any period in which such interference is present. The addition of resistors to the continuous filters as in FIGS. 4 and 5 further enhances the continuous interference dissipation capabilities of the filters because it provides a direct path for conduction of current. The combination of these filters with the transient suppressor 10 provides storage and dissipation devices which help the entire PLF to provide a better suppression and dissipation capability than the devices would alone.

Figure 12:
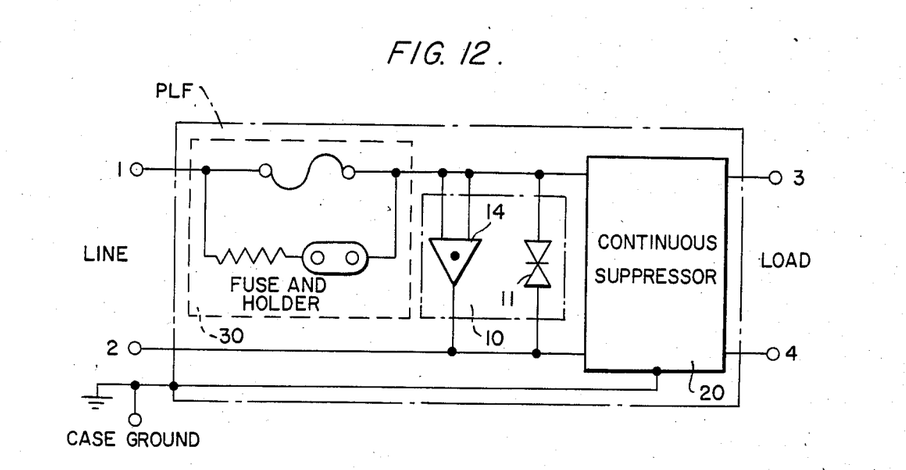
FIG. 12 is a circuit diagram of another embodiment of the alternating current power line filter of the present invention.

FIG. 12 illustrates the theory of operation for a desired power line filter that assumes that low frequency noise, at a frequency lower than the nominal power line frequency, is removed by rectifiers and ripple filters in the power supply of the device to be protected. Curve A represents the desired characteristics for a standard commercial power line filter and curve B for a military application. However, the sharp cutoff of desired filter is very difficult to obtain in actual practice, and the power line filter designer must, for economic reasons, settle for a continuous suppressor 20 targeted at the continuous noise of greatest concern. Curve C illustrates the suppression capability of a typical continuous suppressor 20.

The continuous suppressors 20 of FIGS. 3-5 provide insertion loss in accordance with the following Table 1 and are useful for eliminating broadcast band and very high frequency (VHF) noise including noise generated by microwave ovens.

TABLE 1

| | Insertion Loss | | | |
|---|---|---|---|---|
| | .15 MHz | .20 MHz | .50 MHz | 10 MHz- Hz |
| FIGS. 2 and 3 | 15 dB | 20 dB | 30 dB | 55 dB |
| FIG. 4 | 20 dB | 30 dB | 60 dB | 70 dB |

These continuous suppressors also provide line-to-ground noise and line-to-line interference suppression while having low leakage current suitable low impedance applications. Suitable continuous suppressors available commercially can be obtained from Sprague in their JX5100, JX5200 and JX5300 Series.

Continuous suppressors suitable for common mode and differential mode noise suppression should have insertion loss characteristics as illustrated in the following Table 2. Table 2 also illustrates the desirable loss characteristics for a low current leakage suppressor and a suppressor suitable for telephone line applications.

TABLE 2

| | Insertion Loss | | | | | | | |
|---|---|---|---|---|---|---|---|---|
| | .15 MHz | .20 MHz | .50 MHz | 1.0 MHz | 2.0 MHz | 5.0 MHz | 10 MHz | 20 MHz |
| Common Mode Noise Suppression | 11 | 14 | 24 | 31 | 35 | 49 | 52 | 57 |
| Low Leakage Suppression | 11 | 14 | 21 | 25 | 27 | 28 | 25 | 22 |
| Telephone Line Suppression | 12 | 15 | 22 | 27 | 33 | 40 | 44 | 44 |
| Differential Mode Noise Suppression | 0 | 0 | 1 | 5 | 13 | 28 | 39 | 46 |

Continuous suppressors with the characteristics above can be obtained from Sprague in their JX5400 Series. These suppressors are suitable for protecting low level logic circuitry from noise in the 150 kHz-30 MHz range, as well as from equipment conducted noise.

Figure 6:
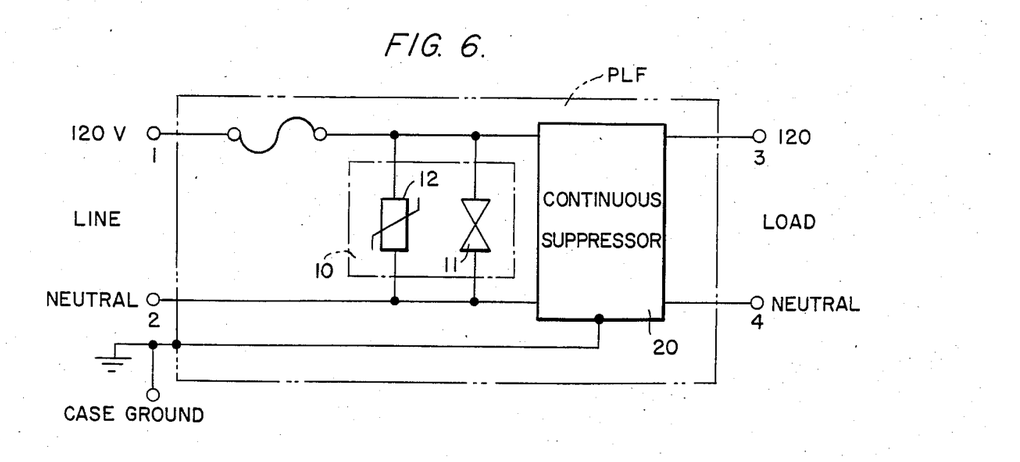
FIG. 6 is a circuit diagram of an embodiment of the power line filter of the present invention illustrating the transient suppressor 10 of FIG. 1 in more detail, connected in conjunction with the continuous suppressor 20 for low energy transients and electromagnetic interference suppression.

FIG. 6 illustrates an embodiment of an alternating current power line filter PLF according to the present invention that can be connected to protect sensitive equipment using three-phase, two-phase or single-phase power. If, for example, the equipment being protected is connected to a two-phase power system, terminal 1 is connected to one of the phases and terminal 2 is connected to the other phase, terminal 3 is connected to the corresponding phase of the device being protected and terminal 4 is connected to the other phase of the device being protected. That is, the power line filter PLF is connected in series with the equipment being protected. As another example, if the power line filter PLF is used to protect a home stereo amplifier, terminals 1 and 2 are respectively connected to the pair of wires that supply power and terminals 3 and 4 are connected.

The power line filter circuit PLF of FIG. 6 includes the continuous suppressor 20 connected between the line terminals 1 and 2 and the load terminals 3 and 4, that is, in series between the power source and the load. The transient suppressor 10 includes a selenium surge suppressor 11 connected between terminals 1 and 2, a metal oxide varistor 12 connected between terminals 1 and 2, while the power line filter PLF of FIG. 8 adds a resistor 13 and a gas tube 14 connected in series between terminals 1 and 2. The elements illustrated in FIGS. 6 and 8 operate separately, sequentially, in parallel and continuously in dependence upon the magnitude and duration of the noise. When the noise transient impinges on the power lines of the sensitive equipment (e.g., the pair of wires providing power to a stereo unit), each of the elements connected between terminals 1 and 2 has the same voltage across it, that is, in FIG. 6, continuous suppressor 20, selenium surge suppressor 11 and metal oxide varistor 12, and, additionally, in FIG. 8, resistor 13 and gas tube 14, because they are connected in parallel, have the same potential applied thereto. As the transient is received by the power line filter PLF, the line voltage between terminals 1 and 2 begins to rise above the normal peak voltage of the power line and continuous suppressor 20 begins to store the excess energy and provides a very high impedance to the transfer of the transient to the load. The storage of the excess energy causes the waveform of the transient to begin to flatten. During this phase where the continuous suppressor 20 is the primary suppression or blocking device, the remainder of the elements (i.e., selenium surge suppressor 11, metal oxide varistor 12 in FIG. 6 and, additionally, resistor 13 and gas tube 14 in FIG. 8) are conducting only very slightly and, therefore, their effects on the transient can be generally ignored. As the line voltage continues to rise, the voltage firing threshold of selenium surge suppressor 11 is reached and passed, and after a delay period of several nanoseconds, selenium surge suppressor 11 enters a substantial conduction phase and flattens the transient waveform further by shunting a portion of the transient and clamping the line voltage. After selenium surge suppressor 11 begins to substantially conduct, the voltage on the power line may continue to rise. If the voltage continues to rise, continuous suppressor 20 continues to store energy and block the transient transfer and selenium surge suppressor 11 continues to conduct. After the transient line voltage rises past the firing voltage of metal oxide varistor 12 and after a delay period of approximately 50 nanoseconds, metal oxide varistor 12 begins to substantially conduct, flattening or suppressing the voltage transient even further by shunting a portion of the transient and clamping the line voltage. If the transient is sufficiently large and has a long time duration, the line voltage continues to rise, continuous suppressor 20 continues to store energy and block the transient transfer and both selenium surge suppressor 11 and metal oxide varistor 12 continue to conduct. In this situation, the embodiment in FIG. 8 should be used, since selenium surge suppressor 11 is only capable of dissipating approximately 800 joules and metal oxide varistor 14 can only dissipate approximately 80 joules in the preferred embodiment. After the transient voltage rises past the firing voltage of gas tube 14 and after a delay period of approximately 0.1 microsecond, gas tube 14 enters into an arcing mode in which a large amount of energy (e.g., 30,000 amps at the arc voltage) is dissipated and the power line voltage is driven to a point well below the peak voltage of the power line, i.e., approximately 30 volts. Continuous suppressor 20, selenium surge suppressor 11 and metal oxide varistor 12 continue to act in parallel to substantially reduce the steep slope of the voltage transient until gas tube 14 enters the arcing mode. The dissipation by continuous suppressor 20, selenium surge suppressor 11 and metal oxide varistor 12 provides a broad range of transient energy suppression, while providing sufficient time for gas tube 14 to fire when the transient is of a long duration (i.e., 1 to 2 milliseconds). When gas tube 14 begins to arc, the voltage on the power line drops below the firing voltage thresholds of both selenium surge suppressor 11 and metal oxide varistor 12, causing both to stop conducting and return to an essentially open circuit state. When gas tube 16 has dissipated the remainder of the energy of the voltage surge, the alternating current signal passes through 0 volts, and gas tube 16 deionizes and returns to its open circuit state. This de-ionization is assisted by carbon wound resistor 13 which has a typical vaue of 0.75 and a two watt capability. Thus, the entire power line filter PLF, except continuous suppressor 20 which continues to suppress continuous noise, returns to a substantially open circuit state. This parallel configuration of elements causes the transient elements of power line filter PFL to fail in an an open mode if an element in the transient suppressor 10 fails catastrophically. If one of the elements of the power line filter PLF (i.e., capacitor 10, selenium surge suppressor 12, metal oxide varistor 14 or gas tube 16) fails in a short circuit state, fuse and holder 30 (FIG. 12) provide a back-up fail open function that removes the power line filter PLF from the power supply and load system. The removal of the power line filter PLF from its particular connection with the power source and the sensitive equipment prevents damage to the sensitive equipment due to a short in the power line filter PLF.

Figure 7:
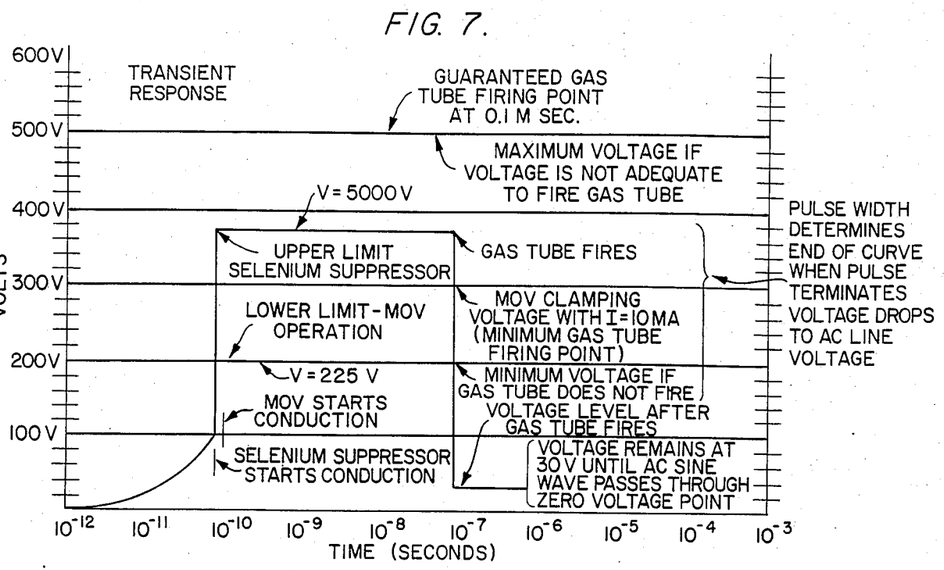
FIG. 7 is a graph illustrating the theory of operation of the transient suppressor 10 illustrated in FIG. 1.
Figure 8:
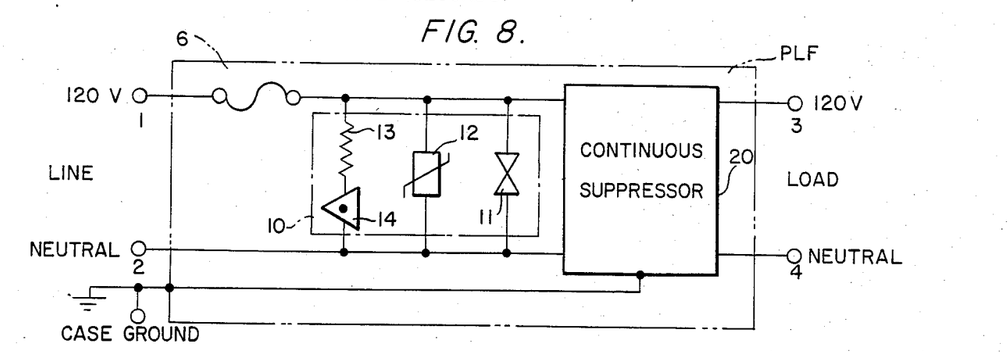
FIG. 8 is a circuit diagram of a grounded power line filter in accordance with the present invention which provides high energy transient and electromagnetic interference suppression.

The theory of operation as well as an example of the operation of the transient suppressor 10 of power line filter PLF is illustrated by a graph in FIG. 7. The graph is based on power line filter PLF designed for a 120 volt rms AC single phase system, as illustrated in FIG. 8. The continuous suppressor 20 is a 20 ampere interference filter model 20JX5106A manufactured by Sprague, selenium surge suppressor 11 is a model SD1544-5 selenium surge suppressor manufactured by CKE, metal oxide varistor 12 is a model VL50LA20A metal oxide varistor manufactured by General Electric, resistor 13 is a carbon wound 0.75 ohm two watt resistor and gas tube 14 is a model 2025-04-B gas tube manufactured by Joslyn. FIG. 2 illustrates the minimum performance characteristics which can be expected when the power line filter PLF having the above components is subjected to a step function (zero slope) of unknown duration. The curve indicates the shape of the leading edge of the output curve on the load side due to shaping by the continuous suppressor 20. At time t=0, (i.e., instantaneously), a step waveform (5000 volts) begins charging capacitor 21 (FIG. 4), while inductor 22 (FIG. 4) presents a very high impedance (substantially infinite) to the rising edge of the transient and substantially prevents the transfer of the leading edge of the transient to the load by forcing capacitor 21 to act as a conductor. At time $t = 1.2 \times 10^{-10}$ seconds, metal oxide varistor 12 begins to conduct and provides additional heat dissipation to protect selenium surge suppressor 11. At time $t=0.1$ microsecond, gas tube 14 fires, driving the output voltage $V_{out}$ to 30 volts. If gas tube 14 has not fired, the output voltage $V_{out}$ reverts to the normal sinusoidal waveform upon the termination of the voltage transient. If gas tube 14 is fired, the output voltage $V_{out}$ is clamped at 30 volts until the normal sinusoidal waveform on the power line passes through 0 volts.

When the power line filter PLF has a small transient, such as a low amplitude radio frequency transient, applied thereto, only the required components of the power line filter PLF will operate. For example, if a transient lasts for a period shorter than the reaction time of selenium surge suppressor 11 only continuous suppressor 20 will operate. If the transient lasts longer than the reaction time of selenium surge suppressor 11, both selenium surge suppressor 11 and continuous suppressor will operate. If the noise transient lasts longer than the reaction time of metal oxide varistor 12, the elements including continuous supressor 20, selenium surge suppressor 11 and metal oxide varistor 12 will act in parallel. Only rarely will gas tube 14 operate when radio frequency noise is being filtered. If the applied signal is just continuous interference only, the continuous filter portion of the PLF alone would operate.

Figure 9:
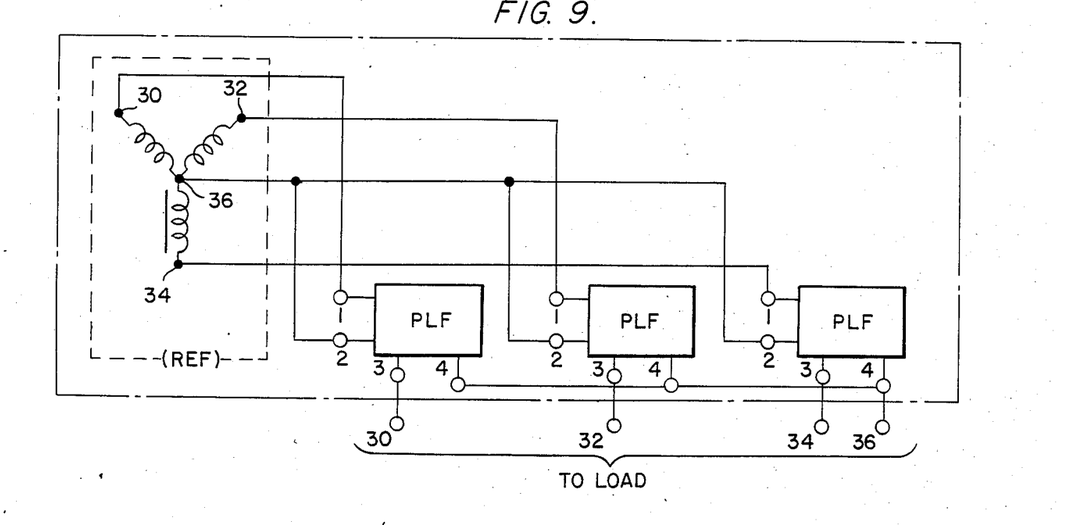
FIG. 9 is a block diagram of three power line filters connected in a three-phase wye protection arrangement according to the present invention.

FIG. 9 is a block diagram of a three-phase wye power system using three power line filters LF to protect a load connected to all three phases. A three-phase wye voltage source is indicted on the left of FIG. 9 by the reference symbol REF and includes three phase terminals 30, 32 and 34, and a neutral terminal 36. As can be seen from the drawing, each power line filter 4 has terminal 1 connected to one of the phases 30, 32 or 34 of the power system and terminal 2 connected to neutral terminal 36. A load (i.e., electronic equipment) is connected to the corresponding output three phases 30, 32 and 34 (terminal 3) of the power line filters, and neutral 36 is a common connection of terminal 4 of the power line filter. Of course, either of the terminals 1 or 2 can be connected to one of the phases 30, 32 or 36, as long as terminals 3 and 4 are correspondingly used as the output terminals.

Figure 10:
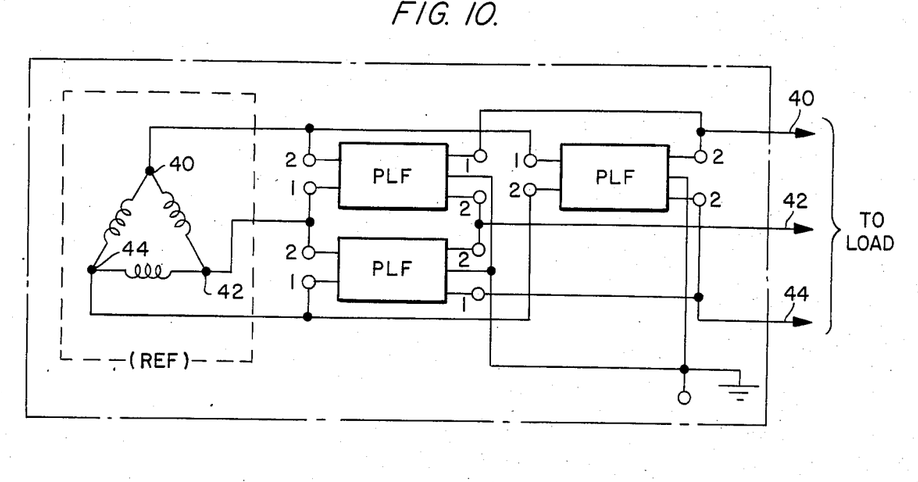
FIG. 10 is a block diagram of a grounded three-phase delta power line filter protection arrangement according to the present invention.

FIG. 10 is a block diagram of a three-phase grounded delta power system using three power line filters PLF, where the source voltage is represented on the left by reference symbol REF and includes three phase terminals 40, 42 and 44. A power line filter PLF is connected to each of the adjacent phases (40–42, 42–44 and 40–44), each of the power line filters PLF is commonly connected to ground and each is connected to the load device to be protected. Each power line filter PLF is connected between (in series) the power source REF and the load.

Figure 11:
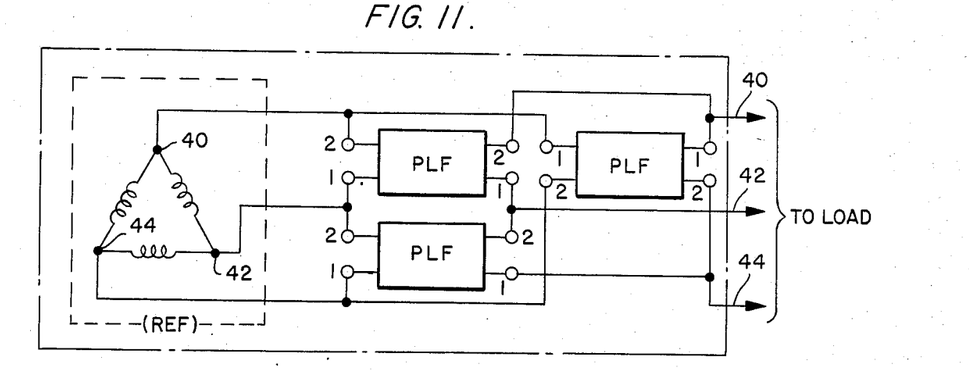
FIG. 11 is a block diagram of an ungrounded three-phase delta power line filter protection arrangement according to the present invention.

FIG. 11 is a block diagram of an ungrounded three-phase delta power line filter arrangement. This arrangement is substantially similar to FIG. 5 except that power line filters which are not commonly connected to ground, are employed.

FIG. 12 is a circuit diagram of an embodiment of a power line filter PLF according to the present invention which eliminates the need for metal oxide varistor 12. If, for example, it is desired to protect equipment connected to a military three-phase ungrounded 400 hertz power system, and if the elements are properly chosen, the need for metal oxide varistor 12 can be eliminated. If, for example, a model No. F5005-02 gas tube manufactured by Joslyn, a model No. SD-4112-30 selenium surge suppressor manufactured by CKE and a model No. 20JX5106A continuous suppressor 20 manufactured by Sprague and designed for 450 volt 400 hertz operation are used as gas tube 14, selenium surge supressor 12 and continuous suppressor 20, the elimination of metal oxide varistor 12 becomes possible because selenium surge suppressor 11 is capable of absorbing a sufficient amount of energy to allow gas tube 14 sufficient time to fire.

Figure 13:
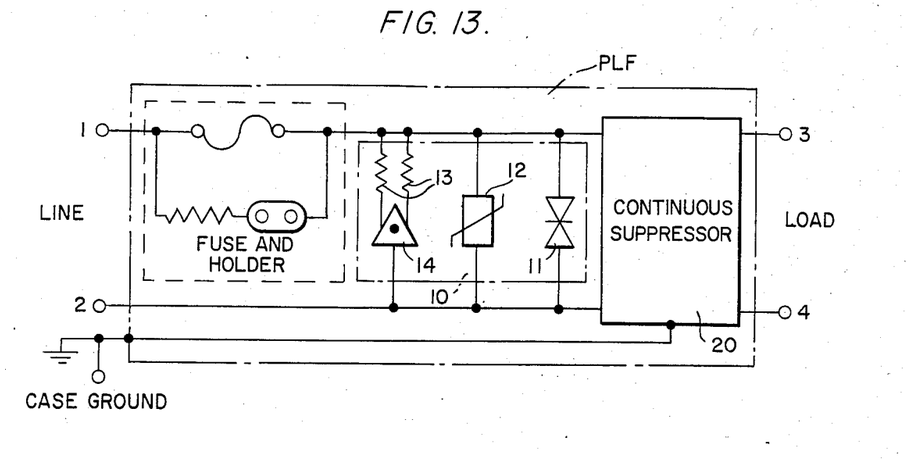
FIG. 13 is a circuit diagram of still another embodiment of the alternating current power line filter of the present invention.

FIG. 13 is a circuit diagram of a power line filter PLF useful for operation in an environment where it is necessary to restrict heat dissipation by gas tube 14. In this embodiment, resistors 13 are connected in series with gas tube 14 to provide a current limiting and, therefore, heat dissipation limiting capability. This embodiment would be used in a temperature sensitive environment, such as enclosed portable test equipment. Of course, the provision of resistors 13 reduces the capability of the power line filter PLF to dissipate large amounts of transient energy, but, nevertheless, maintains the ability to respond instantaneously to the voltage transient and continuously filter the continuous type noise.

Figure 14:
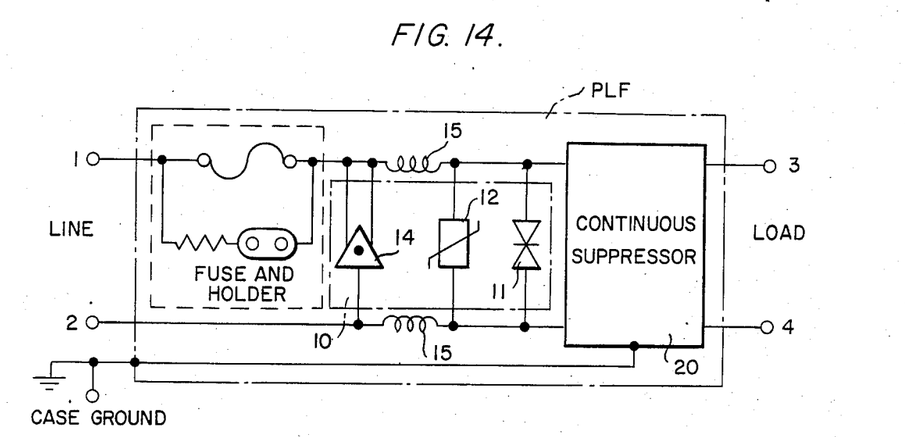
FIG. 14 is a circuit diagram of a further embodiment of the power line filter of the present invention.

FIG. 14 is a circuit diagram of another power line filter PLF according to the present invention where coils or chokes 15 are provided between the gas tube 14 and the parallel combination of metal oxide varistor 12, selenium surge suppressor 11 and continuous suppressor 20. This embodiment limits the high frequency dissipation capability of the power line filter PLF and would be used, for example, in situations where the power line is used as a signal carrier as well as power source.

Figure 15:
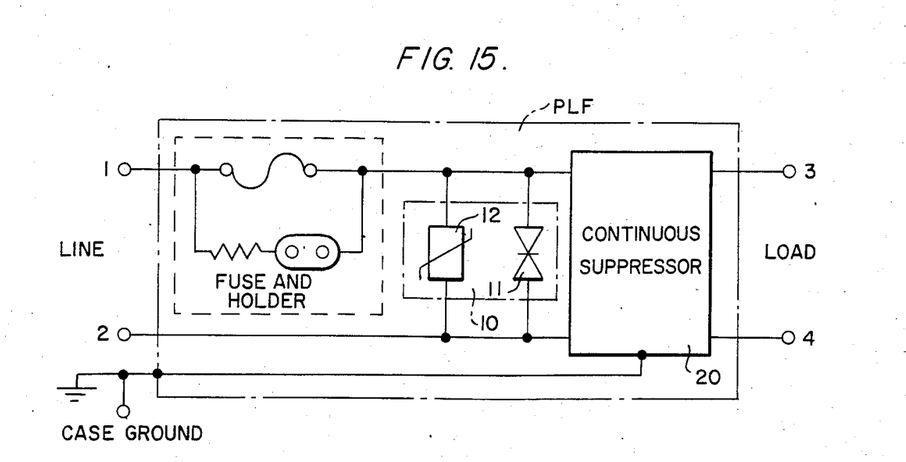
FIG. 15 is a circuit diagram of a direct current embodiment of the power line filter of the present invention.

FIG. 15 is a circuit diagram of a direct current embodiment of a power line filter PLF according to the present invention. The direct current power line filter 52 does not include a gas tube 14 because the use of gas tube 14 requires a zero voltage crossing in order to extinguish any arc that may occur. Thus, the direct current power line filter PLF does not dissipate as large an amount of energy as the alternating current versions which include the gas tube 14. The sequence of operation of the direct current version is substantially similar to the sequence described earlier with reference to FIG. 8.

The power line filter module of the present invention provides transient surge supression or dissipation of electromagnetic interference having a broad frequency range and very large amplitudes, transverse mode and common mode interference protection, as well as protection against electrical ground loop noise interference inherent within electrical systems. The power line filter module also provides protection against various types of continuous of noise, such as induced or conducted electromagnetic interference. The power line filter module also provides continuous protection against other types of continuous noise, such as induced or conducted radio frequency interference. The combination of a transient suppressor with a continuous suppressor provide substantial protection benefits over the provision of only one type of suppressor. The range of protection is substantially increased, the transfer of the transient to the load can be substantially blocked and continuous noise can be eliminated. The modularity of the filter also allows the designer to select appropriate components which are specificlly designed for the noise environment presented.

The many features and advantages of the present invention are apparent from the detailed specification and, thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described and, accordingly, all suitable modifications and equivalents may be resorted to, falling within the scope of the invention.

What is claimed is:

1. A power line filter having first and second line terminals providing a line voltage and first and second load terminals, said filter receiving a transient over first through fourth time periods and receiving long-term broad spectrum continuous interference, and comprising:

transient suppression means, connected between said first and second line terminals, for shunting the transient and clamping the line voltage, said transient suppression means comprising:

first clamping means, connected between the first and second line terminals, for shunting a part of the energy of the transient and clamping the line voltage during the second and third time periods, said first clamping means comprising a selenium surge suppressor having an energy dissipation capability of at least 800 joules;

second clamping means, connected between the first and second line terminals, for shunting a part of the energy of the transient and clamping the line voltage in conjunction with said first clamping means during the third time period; and shunt means, connected between the first and second line terminals, for shunting part of the energy of the transient during the fourth time period and turning off said first and second clamping means at the beginning of the fourth time period; and continuous suppression and dissipation means, connected between said first and second line terminals and said first and second load terminals, for dissipating the continuous interference and storing part of the energy of the transient during the first through third time periods, said continuous suppression means including: energy storage means for storing a part of the energy of the transient during the first through third time periods and for transferring the stored energy to said transient suppression means during the second through fourth time periods; and energy dissipation means for dissipating another part of the energy of the transient during the first through fourth time periods, said transient suppression means shunting the stored energy during the second through the fourth time periods.

2. A power line filter as recited in claim 1, wherein said continuous suppression means comprises:
a first capacitor connected between said first and second line terminals;
an inductor connected to said first and second line terminals and said first and second load terminals;
a second capacitor connected between said first load terminal and ground; and
a third capacitor connected between said second load terminal and ground.

3. A power line filter as recited in claim 2, wherein said continuous suppression means further comprises:
a first resistor connected between said first and second line terminals; and
a fourth capacitor connected between said first and second load terminals.

4. A power line filter as recited in claim 1, wherein said continuous suppression means comprises a common-mode noise filter including a capacitor connected between said first and second line terminals.

5. A power line filter as recited in claim 1, wherein said continuous suppression means comprises a low leakage filter including a capacitor connected between said first and second line terminals.

6. A power line filter as recited in claim 1, wherein said continuous suppression means comprises a telephone line filter including a capacitor connected between said first and second line terminals.

7. A power line filter as recited in claim 1, wherein said continuous suppression means comprises a differential mode filter including a capacitor connected between said first and second line terminals.

8. A powerline filter as recited in claim 1, wherein said first clamping means has a first operation threshold voltage, said second clamping means has a second operation threshold voltage and said shunt means has a third operation threshold voltage, said first operation threshold voltage is less than or equal to said second operation threshold voltage and said third operation threshold voltage is less than or equal to both said first and second operation threshold voltages.

9. A power line filter as recited in claim 8, wherein said continuous suppression means includes transient resistance means, connected between said line terminals and said load terminals, for providing a resistance which increases as the slope of the transient increases.

10. A power line filter having first and second line terminals providing a line voltage and first and second load terminals, said filter receiving a transient over first through fourth time periods and receiving long-term broad spectrum continuous interference, and comprising:
continuous suppression and dissipation means, connected between said first and second line terminals and said first and second load terminals, for dissipating the continuous interference, storing part of the energy of the transient during the first through third time periods, and dissipating another part of the energy of the transient during the first through fourth time periods; and
transient suppression means, connected between said first and second line terminals, for shunting the transient including the energy stored by said continuous suppression means and clamping the line voltage, said transient suppression means comprising:
first clamping means, connected between the first and second line terminals, for shunting a part of the energy of the transient and clamping the line voltage during the second and third time periods, said first clamping means comprising a selenium surge suppressor having an energy dissipation capability of at least 800 joules;
second clamping means, connected between the first and second line terminals, for shunting a part of the energy of the transient and clamping the line voltage in conjunction with said first clamping means during the third time period; and
shunt means, connected between the first and second line terminals, for shunting part of the energy of the received transient during the fourth time period and turning off said first and second clamping means at the beginning of the fourth time period.

11. A power line filter as recited in claim 10, wherein said shunt means is a gas tube.

12. A power line filter as recited in claim 11, wherein said gas tube is connected to ground.

13. A power line filter as recited in claim 12, further comprising a resistor operatively connected between said gas tube and one of the first or second terminals.

14. A power line filter as recited in claim 9, wherein said second clamping means is a metal oxide varistor.

15. A powerline filter as recited in claim 10, wherein said first clamping means has a first operation threshold voltage, said second clamping means has a second operation threshold voltage and said shunt means has a third operation threshold voltage, said first operation threshold voltage is less than or equal to said second operation threshold voltage and said third operation threshold voltage is less than or equal to both said first and second operation threshold voltages.

16. A power line filter as recited in claim 15, wherein said continuous suppression means includes transient resistance means, connected between said line terminals and said load terminals, for providing a resistance which increases as the slope of the transient increases.

17. A power line filter for dissipating a transient, for clamping a line voltage and for continuous interference suppression on a three-phase power system having first, second and third line phases and a neutral, each phase and neutral pair including first and second line terminals providing a line voltage and first and second load terminals, said filter receiving a transient over first through fourth time periods and receiving long-term broad spectrum interference, said filter comprising:
first, second and third power line filter modules, said first power line filter module connected to the first phase and neutral, said second power line filter module connected to the second phase and neutral, and said third power line filter module connected to the third phase and neutral, each of said power line filter modules comprising:
transient suppression means, connected between the respective phase and neutral, for shunting the transient and clamping the line voltage, said transient suppression means comprising:
first clamping means, connected between the first and second line terminals, for shunting a part of the energy of the transient and clamping the line voltage during the second and third time periods, said first clamping means comprising a selenium surge suppressor having a dissipation capability of at least 800 joules;
second clamping means, connected between the first and second line terminals, for shunting a part of the energy of the transient and clamping the line voltage in conjunction with said first clamping means during the third time period; and
shunt means, connected between the first and second line terminals, for shunting part of the energy of the transient during the fourth time period and turning off said first and second clamping means at the beginning of the fourth time period; and
continuous suppression and dissipation means, operatively connected to the respective phase and neutral, for dissipating the continuous interference, storing part of the energy of the transient during the first through third time periods and dissipating another part of the energy of the transient during the first through fourth time periods, and said transient suppression means shunting the stored energy during the second through the fourth time periods.

18. A powerline filter as recited in claim 17, wherein said first clamping means has a first operation threshold voltage, said second clamping means has a second operation threshold voltage and said shunt means has a third operation threshold voltage, said first operation threshold voltage is less than or equal to said second operation threshold voltage and said third operation threshold voltage is less than or equal to both said first and second operation threshold voltages.

19. A power line filter as recited in claim 18, wherein said continuous suppression means includes transient resistance means, connected between said line terminals and said load terminals, for providing a resistance which increases as the slope of the transient increases.

20. A power line filter for dissipating a transient, for clamping a line voltage and for continuous interference suppression on a three-phase delta power system having first, second and third phases, each phase including first and second line terminals providing a line voltage and first and second load terminals, said filter receiving a transient over first through fourth time periods and receiving long-term broad spectrum continuous interference, said filter comprising:
  first, second and third power line filter modules, said first power line filter module connected to the first and second phases, said second power line filter module connected to the second and third phases and said third power line filter module connected to the first and third phases, each of said power line filter modules comprising:
  transient suppression means, connected between the first and second line terminals, for shunting the transient and clamping the line voltage, said transient suppression means comprising:
    first clamping means, connected between the first and second line terminals, for shunting a part of the energy of the transient and clamping the line voltage during the second time period, said first clamping means comprising a selenium surge suppressor having an energy dissipation capability of at least 800 joules;
    second clamping means, connected between the first and second line terminals, for shunting a part of the energy of the transient and clamping the line voltage in conjunction with said first clamping means during the third time period; and
    shunt means, operatively connected between the first and second line terminals, for shunting part of the energy of the transient during the fourth time period and turning off said first and second clamping means at the beginning of the fourth time period; and
  continuous suppression and dissipation means, operatively connected to the respective phase and neutral, for dissipating continuous interference, storing part of the energy of the transient during the first through third time periods and dissipating another part of the energy during the first through fourth time periods, and said transient suppression means shunting the stored energy during the second through fourth time periods.

21. A powerline filter as recited in claim 20, wherein said first clamping means has a first operation threshold voltage, said second clamping means has a second operation threshold voltage and said shunt means has a third operation threshold voltage, said first operation threshold voltage is less than or equal to said second operation threshold voltage and said third operation threshold voltage is less than or equal to both said first and second operation threshold voltages.

22. A power line filter as recited in claim 21, wherein said continuous suppression means includes transient resistance means, connected between said line terminals and said load terminals, for providing a resistance which increases as the slope of the transient increases.

23. A direct current power line filter having first and second line terminals providing a line voltage and first and second load terminals, said filter receiving a transient over first through third time periods and receiving long-term broad hard continuous interference, and comprising:
  transient suppression means, connected between said first and second line terminals, for shunting the transient and clamping the line voltage, said transient suppression means comprising:
    first clamping means, connected to the first and second line terminals, for shunting a part of the energy of the transient and clamping the line voltage during the second and third time periods, said first clamping means comprising a selenium surge suppressor having an energy dissipation capability of at least 800 joules; and
    second clamping means, connected to the first and second line terminals, for shunting part of the energy of the transient and clamping the line voltage in conjunction with said first clamping means during the third time period; and
  continuous suppression and dissipation means, connected between said first and second line terminals and said first and second load terminals, for dissipating the continuous interference, storing part of the energy of the transient during the first through second time periods and dissipating another part of the energy of the transient during the first through third time periods, and said transient suppression means shunting the stored energy during the second through fourth time periods.

24. A powerline filter as recited in claim 23, wherein said first clamping means has a first operation threshold voltage, said second clamping means has a second operation threshold voltage and said shunt means has a third operation threshold voltage, said first operation threshold voltage is less than or equal to said second operation threshold voltage and said third operation threshold voltage is less than or equal to both said first and second operation threshold voltages.

25. A power line filter as recited in claim 24, wherein said continuous suppression means includes transient resistance means, connected between said line terminals and said load terminals, for providing a resistance which increases as the slope of the transient increases.

* * * * *

UNITED STATES PATENT AND TRADEMARK OFFICE
CERTIFICATE OF CORRECTION

PATENT NO. : 4,698,721

DATED : October 6, 1987

INVENTOR(S) : Warren

It is certified that error appears in the above-identified patent and that said Letters Patent is hereby corrected as shown below:

Col. 7, line 18, "10" should be --21--;
"12" should be --11--;

line 19, "14" should be --12--.

Col. 8, line 13, "LF" should be --PLF--;
line 15, "indicted" should be --indicated--;
line 58, "12" should be --11--.

Col. 11, line 65, "9" should be --10--.

Signed and Sealed this

Nineteenth Day of April, 1988

Attest:

DONALD J. QUIGG

Attesting Officer      Commissioner of Patents and Trademarks